July 29, 1924.　　　　　　　　　　　　　　　　　　　1,503,440
J. L. WOODBRIDGE
MEANS FOR INTERCONVERTING ALTERNATING AND DIRECT CURRENT
Filed Nov. 15, 1918　　　2 Sheets-Sheet 1

FIG.1.

WITNESS:

INVENTOR
J. Lester Woodbridge
BY
Augustus B. Stoughton.
ATTORNEY.

July 29, 1924.

J. L. WOODBRIDGE 1,503,440

MEANS FOR INTERCONVERTING ALTERNATING AND DIRECT CURRENT

Filed Nov. 15, 1918    2 Sheets-Sheet 2

WITNESS:
Rob R Mitchel

INVENTOR
J. Lester Woodbridge
BY
Augustus B. Stoughton
ATTORNEY.

Patented July 29, 1924.

1,503,440

UNITED STATES PATENT OFFICE.

JOSEPH LESTER WOODBRIDGE, OF PHILADELPHIA, PENNSYLVANIA.

MEANS FOR INTERCONVERTING ALTERNATING AND DIRECT CURRENT.

Application filed November 15, 1918. Serial No. 262,731.

*To all whom it may concern:*

Be it known that I, JOSEPH LESTER WOODBRIDGE, a citizen of United States, and a resident of Philadelphia, in the State of Pennsylvania, have invented certain new and useful Improvements in Means for Interconverting Alternating and Direct Current, of which the following is a specification.

My invention relates to apparatus designed for the conversion of alternating currents into direct currents or vice versa, and more particularly to apparatus in which windings enclosing a magnetic circuit and connected to an alternating current circuit are connected to a commutator provided with direct current brushes with means for producing relative rotation of commutator and brushes.

The object of my invention is to provide efficient and comparatively inexpensive means for converting alternating currents into direct currents, or vice versa, and for providing such apparatus which will utilize a sine wave of alternating E. M. F. and develop a constant E. M. F. at the direct current terminals when transforming from A. C. to D. C., or will develop a sine wave of alternating E. M. F. when a constant direct current E. M. F. is applied to the D. C. terminals when converting from D. C. to A. C.

Another object of my invention is to provide for satisfactory commutation in apparatus of the kind described. A further object is to provide for controlling the ratio between the A. C. and the D. C. E. M. F. at the corresponding terminals of the apparatus and also to provide for controlling the power factor of the current taken from or delivered to the A. C. circuit. These and other objects of the invention will be more clearly understood by reference to the following description taken in connection with the accompanying drawings, in which—

Figure 1:
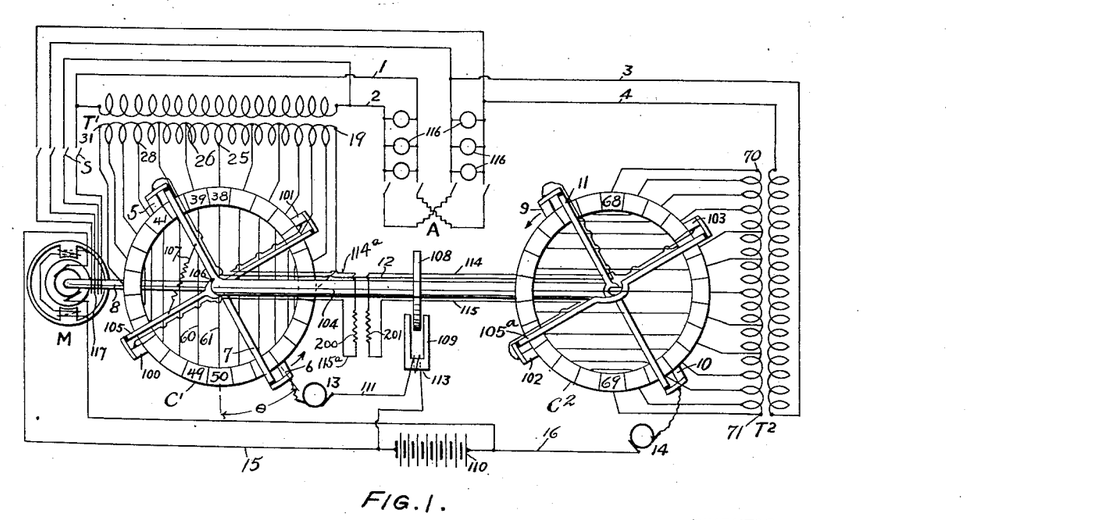
Fig. 1 shows diagrammatically apparatus designed for converting direct currents into alternating currents or vice versa and provided with automatic means for controlling the ratio of the direct current to the alternating current E. M. F.

Referring to Fig. 1, A is a source of two phase alternating current E. M. F. connected, when the switches shown are closed, to the two phase circuit 1, 2, 3, 4. Across the conductors 1, 2, is connected the primary winding of a transformer $T^1$ whose secondary winding is connected by means of taps located at various points along the winding to a commutator $C^1$. Similarly across the circuit 3, 4, is connected the primary winding of a transformer $T^2$ whose secondary winding is connected in the same manner by means of distributed taps to the commutator $C^2$. Upon the commutator $C^1$ two pair of brushes 5, 6 and 100, 101 make contact. Similarly upon commutator $C^2$, two pair of brushes 9, 10, and 102, 103, make contact. The brushes 100 and 101 are supported on and insulated from the arm 105, carried on a shaft 8, driven by a motor M. The brushes 102 and 103 are supported on and insulated from the arm $105^a$ attached to the other end of shaft 8. The main brushes 5, 6, 9 and 10 are mounted on a hollow shaft or sleeve 104, surrounding shaft 8 and adapted to be rotated with respect to the shaft 8. The arm 105 which carries the brushes 100 and 101 is provided with a stop 106 which engages the arm 7 carrying the brushes 5, 6. The tension spring 107 extending between the arm 7 and the arm 105 normally holds the arm 7 against this stop and in this position the two arms are at right angles. If while the shaft 8 is rotating a braking action be applied to the sleeve 104, sufficient to overcome the tension of the spring 107, the position of the brushes 5 and 6 will be shifted with respect to the brushes 100, 101. In order to apply such a braking effort to the sleeve 104, a disc 108 of conducting material is rigidly attached to the sleeve 104, arranged to rotate between the poles of an electromagnet 109. When a sufficient excitation is applied to this magnet a retarding force will be developed in the disc in the well known manner sufficient to overcome the tension of spring 107. Brushes 5 and 9 are connected together by means of a conductor 12, running along the arms 7 and 11 and the shaft 104. Brush 6 is connected by means of a collector ring 13 to one conductor 15 of the direct current circuit. Brush 10 is similarly connected by means of a collector ring 14 to the other conductor 16 of the direct current circuit. For the sake of clearness the collector rings 13 and 14 are shown as detached from the shaft, but it will be understood that these collector rings would be mounted on the shaft. A storage battery 110 is connected between the conductors 15 and 16.

The connections between the secondary winding of transformer $T^1$ and the commutator $C^1$ are arranged in a novel manner to produce the results hereinafter described. The middle point 25 of the transformer secondary winding is connected to commutator segment 38 and this segment is connected by means of conductor 61 to the diametrically opposite segment 50. Similarly point 26 in the secondary winding of the transformer is connected to segment 39 of the commutator and this segment is connected by means of conductor 60 to segment 49 located at the opposite end of a chord parallel to the diameter 38, 50. Similarly the other points in the transformer secondary winding are connected to the several commutator segments covering 180° of the commutator and each of these segments is connected to the segment at the other extremity of a chord parallel to the diameter 38, 50. The taps from the secondary winding of the transformer are not spaced equally along said winding, but are located in accordance with the sine law; that is, any tap, such as 28, connected to the commutator segment 41, is so located that the number of turns of the secondary winding between 28 and the middle point 25 is proportional to the sine of the angle of displacement between segment 41 and segment 38.

The connections between commutator $C^2$ and the secondary of transformer $T^2$ are exactly the same as those between commutator $C^1$ and transformer $T^1$ except that the entire commutator and its connections are displaced through an angle of 90° with respect to the brushes 9, 10; that is to say, when the brushes 5, 6, are in contact with commutator segments 38, 50 respectively, which are connected to the middle point 25 of the secondary winding of transformer $T^1$ brushes 9 and 10 will be making contact with segments 68 and 69 respectively, which are connected to the outer terminals of the secondary winding of transformer $T^2$. The motor M is provided with a commutator and brushes connected across the battery 110 and may thus be operated as a direct current motor. It is also provided with collector rings 117 suitably connected to the armature winding by which the motor may be operated from the alternating current circuit 1, 2, 3, 4 when the switches S are closed. In the latter case the direct current circuit to the motor would be opened by lifting the brushes or otherwise.

When the apparatus shown in Fig. 1 is to be used for converting alternating current to direct current the source A will be connected to the alternating current circuit and the motor M will be driven from the same circuit thus causing the brushes to be rotated about the commutators in synchronism with the source. For this method of operation brushes 100, 101, 102 and 103 would not be used, and would either be moved out of contact with the commutators or their circuits disconnected.

By reason of the two phase E. M. F. developed by the source A, alternating electromotive-forces will be developed in the secondary windings of transformer $T^1$ and $T^2$ displaced in phase by an angle of 90°. The E. M. F. across the brushes 5, 6 at any instant during their rotation around the commutator will be proportional to the total instantaneous E. M. F. between the terminals 19 and 31 of the secondary winding of transformer $T^1$ multiplied by the ratio which the number of turns of the secondary winding included between the brushes 5, 6, at that instant, bears to the total number of turns in the secondary winding. This ratio will be proportional to the sine of the angle θ. If the apparatus is so designed and connected that the brushes 5, 6, are making contact with the commutator segments 38, 50 respectively at the instant when the E. M. F. across the terminals 19, 31 is zero, then the E. M. F. across 19, 31, at any other instant will be proportional to the sine of θ. If A represents the maximum value of E. M. F. between 19 and 31, then the momentary value at any other instant will be represented by A sin θ. The momentary value of the E. M. F. across the brushes 5, 6, will, therefore, be at any instant A sin² θ.

The E. M. F. developed across the terminals 70 and 71 of the secondary winding of transformer $T^2$ will be displaced 90° from that across the terminals 19, 31 and will, therefore, be represented by the expression A cos θ. Similarly when the brushes 5, 6, are in contact with commutator segments 38 and 50 respectively, the brushes 9 and 10 will be in contact with segments 68 and 69 respectively, embracing all of the turns of the secondary winding of transformer $T^2$. The number of turns included between the brushes 9 and 10 at any other instant will be proportional to cos θ and the E. M. F. between the brushes 9 and 10 at any instant will, therefore, be equal to A cos² θ. Since the brushes 5, 6, and the brushes 9, 10 are connected in series, the total E. M. F. between brush 6 and brush 10, that is, the E. M. F. developed at the direct current terminals of the apparatus, will be equal to the sum of the instantaneous electro-motive-forces across the brushes 5, 6, and 9, 10, respectively; that is, the direct current E. M. F. at these terminals will be equal to a sine$^2$ θ+A cos$^2$ θ, which equals A. It will thus be seen that with a sine wave of E. M. F. impressed on the alternating current terminals a constant direct current E. M. F. will be developed at the direct current terminals. Furthermore, when a constant direct current is taken from the direct current terminals, this current at any instant will pass through that portion of the secondary winding of each transformer which is included between the two brushes of each commutator respectively. The magneto motive force developed by this direct current in the secondary windings will vary in accordance with the sine law, since the number of turns through which the direct current passes will vary in accordance with this law as the brushes are revolved. It follows, therefore, that the current delivered by the source A to the primary windings of the two transformers will also vary in accordance with the sine law.

Figure 2:
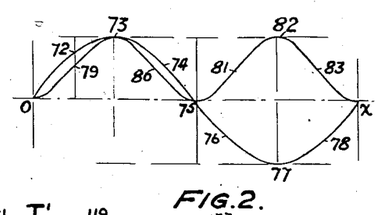
Fig. 2 and Fig. 3 are curves showing the relation of electro-motive-forces at the alternating current terminals and direct current brushes.
Figure 3:
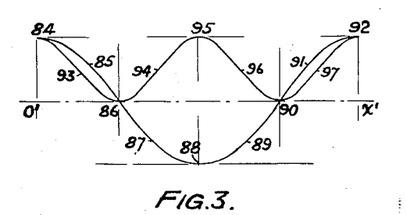

The relation of electro-motive-forces at the alternating current and direct current terminals of the apparatus shown in Fig. 1 is illustrated graphically in Figs. 2 and 3. In Fig. 2 let the line OX represent the time required for one complete revolution of the brushes; that is, 360 electrical degrees. Let the point O represent the instant when the brushes 5 and 6 are making contact with the commutator segments 38 and 50 respectively. At this instant the A. C. E. M. F. at the terminals of transformer T$^1$ is zero. Assuming a sine wave of A. C. E. M. F., the curve O, 72, 73, 74, 75, 76, 77, 78, will represent the instantaneous values of E. M. F. across the terminals 19, 31 during one complete cycle. The E. M. F. across the brushes 5, 6, at any instant will be less than the E. M. F. across the terminals 19, 31, in the ratio of the number of turns included in the circuit between the two brushes to the total number of turns in the secondary winding. For example: At the instant corresponding to the point 72 on the curve of A. C. E. M. F., at which point θ=45°, the E. M. F. across the brushes 5, 6, will be .707 times the E. M. F. represented by the ordinate 72 and will correspond to the point 79. The curve O, 79, 73, 80, 75, 81, 82, 83, X is derived in this way from the curve of A. C. E. M. F. and represents the instantaneous values of the E. M. F. across the brushes, 5, 6, during the complete cycle. It will be noted that whereas the alternating E. M. F. reverses during the last half of the wave, the E. M. F. across the brushes 5, 6, remains positive in value, since the relative position of the two brushes with reference to the middle point of the transformer winding is reversed at the instant that they pass over the commutator segments 38, 50 respectively.

Fig. 3 shows similarly the relation between the electro-motive-forces in the transformer T$^2$ and at the brushes 9 and 10. In this figure O$^1$ X$^1$ represents the period corresponding to a complete cycle beginning at the instant when the brushes 9 and 10 are in contact with commutator segments 68 and 69. At this instant the A. C. E. M. F. across the terminals 70 and 71 is at its maximum instantaneous value, and the total number of turns in the transformer secondary winding is in circuit between the brushes 9 and 10. The curve 84, 85, 86, 87, 88, 89, 90, 91, 92 therefore represents the A. C. E. M. F. between the terminals 70 and 71 during one complete cycle, while the curve 84, 93, 86, 94, 95, 96, 90, 97, 92, represents the instantaneous values of E. M. F. across the brushes 9, 10 during the same cycle. The total E. M. F. between the direct current terminals 13 and 14 of the apparatus shown in Fig. 1 will be represented by the sum of ordinates of the two curves in Figs. 2 and 3 corresponding to the electro-motive-forces across the D. C. brushes and it will be seen that the sum of corresponding ordinates of these two curves is constant and equal to the maximum momentary value of the A. C. E. M. F.

If the zero value of A. C. E. M. F. across the terminals 19 and 31 of the secondary winding of transformer T$^1$ does not occur at the instant the brushes 5 and 6 are in contact with commutator segments 38 and 50 respectively, let us assume that this A. C. E. M. F. lags by an angle α behind the instantaneous position of the brushes, so that when the brushes occupy a position corresponding to the angle θ with respect to commutator segments 38 and 50, the A. C. E. M. F. across the terminals 19 and 31 is equal to A sin (θ—α), then the E. M. F. across the brushes 5, 6, will be represented by the expression A sin θ sin (θ—α). Similarly the E. M. F. across the brushes 9, 10, will be represented by the expression A cos θ cos (θ—α). The sum of these two electro-motive-forces or the D. C. E. M. F. at the terminals 13, 14, will then be represented by the expression A cos α.

From the above it will be seen that the ratio between the alternating current E. M. F. and the direct current E. M. F. at the terminals 13, 14, may be varied by varying the phase relation between the position of the brushes and the wave of A. C. E. M. F. In Fig. 1 are shown means for controlling this phase relation consisting of the disc 108 and the electromagnet 109. The latter is provided with an exciting coil 113 connected by conductor 111 in series between the direct current terminal 13 and the corresponding terminal of the storage battery 110. As explained above, the braking action of the magnet 109 on the disc 108, acting against the tension of the spring 107 will shift the phase position of the arms 7 and 11 and the brushes 5, 6, 9 and 10 with respect to arms 105 and 105ª and brushes 100, 101, 102 and 103 and therefore with respect to the applied A. C. electromotive force and will thus automatically change the ratio between the alternating current and direct current E. M. F.

The apparatus shown in Fig. 1 when operated as described above is adapted for connection between an alternating current circuit and a direct current circuit when there is a source of alternating current E. M. F. connected to the alternating current circuit adapted to supply the magnetizing current required for the transformers $T^1$ and $T^2$. If there is no source of alternating current connected to the A. C. circuit, but only a direct current source connected to the direct current circuit, means must be provided for supplying the magnetizing current from the direct current circuit. Such means are provided by the second pair of brushes 100, 101, 102, 103 bearing upon each of the commutators but displaced in position from the main brushes 5, 6, and 9, 10. As shown, these brushes are displaced by an angle of 90°, but by means of the hollow shaft 104, the disc 108 and the magnet 109 this angle may be varied in order to vary the ratio of A. C. to D. C. E. M. F.

Brushes 100 and 101 are connected by conductors 115ª and 114ª respectively to opposite terminals of a transformer winding 200 and brushes 102 and 103 are similarly connected by conductors 115 and 114 respectively to the opposite terminals of transformer winding 201. These two transformer windings 200 and 201 are wound on the same magnetic circuit, and have the same number of turns. The transformer may be mounted in any convenient manner on the sleeve 104, so as to revolve with it, or it may be stationary, in which case the connections to conductors 114, 115, 114ª and 115ª would be made by means of slip rings in the well known manner.

When quarter-phase alternating E. M. F.'s are developed in transformers $T^1$ and $T^2$ and brushes 100, 101, 102 and 103 are rotated in synchronism therewith and in such phase relation that each pair of brushes embraces the total number of turns of the corresponding transformer winding at the instant that the E. M. F. in that winding passes through zero, then there will be developed between the brushes of each pair an alternating E. M. F. of double frequency and the two double frequency E. M. F.'s will be in phase with each other. The windings 200 and 201 act as choke coils to these two E. M. F.'s. As will be more fully described below, a direct magnetizing current will flow between brushes 100 and 101, and a similar current between brushes 102 and 103, and the magneto-motive-forces of these two currents in transformer windings 200 and 201 will be equal and opposite and will therefore neutralize each other.

The mode of operation of the apparatus shown in Fig. 1 when connected as described above is as follows:

Assume a small amount of direct current transmitted from the battery via conductor 111 and collector ring 13 to brush 6 and from brush 6 through the turns of the secondary winding of transformer $T^1$ which are in circuit, to brush 5, thence via conductor 12 to brush 9, and from brush 9 through the turns of the secondary winding of transformer $T^2$ which are in circuit to brush 10, thence via collector ring 14 and conductor 112 to the other terminal of the battery. This small amount of current will produce a small magneto-motive-force in the two transformers, and by reason of the rotation of the brushes and the distribution of the taps between the commutators and the two transformer windings, this magneto-motive-force will vary in accordance with the sine law and will produce an alternating electro-motive-force of small value in the transformer windings. This E. M. F. will, however, be in time-quadrature with the magnetic flux, and will, therefore, produce pulsating unidirectional E. M. F.'s across the brushes 100 and 101 and also across the brushes 102 and 103. That is, across brushes 100, 101, this E. M. F. will be equal to $X \cos^2 \theta$ and across brushes 102, 103 it will be equal to $X \sin^2 \theta$. But $X \cos^2 \theta = \frac{1}{2}X + \frac{1}{2}X \cos^2 \theta$ and $X \sin^2 \theta = \frac{1}{2}X - \frac{1}{2}X \cos^2 \theta$. Each of these electro-motive-forces consists of a direct component and an alternating component of double frequency. The transformer windings 200 and 201 act as choke coils to the alternating components, preventing any appreciable flow of alternating current, while the direct components are not opposed and cause a small direct current to flow between brushes 100 and 101, and between brushes 102 and 103. This constant direct current will act in the same way as the current input from the battery to the circuit of the brushes 6, 5, 9 and 10, as described above, and will, therefore, produce a direct current counter-electro-motive-force in space quadrature with the brushes 100, 101, 102, 103, and this counter-electro-motive-force will, therefore, be directly opposed to the E. M. F. of the battery 110, and will be of sufficient value to limit the initial flow of current from the battery through the circuit of the brushes 6, 5, 9, and 10 to the value necessary to produce the required counter-electro-motive-force; for if this counter-electro-motive-force should be less than the required value, the flow of current from the battery would be increased, thus increasing the initial magneto-motive-force and therefore the direct E. M. F. in the circuit of the short circuit brushes, which will increase the counter E. M. F. produced by this current until it does reach the value required for equilibrium.

The terminals of the primary windings of the transformers T¹ and T² are connected to the alternating current circuit 1, 2, 3, 4, and if current is taken from these windings as by the translating devices 116, the effect of this current in the transformers will be to counteract the magneto motive force of the current supplied by the battery 110 to the circuit of the brushes 6, 5, 9, and 10, and thereby reduce the counter-electro-motive-force which opposes the E. M. F. of the battery. The battery will, therefore, deliver an additional amount of current to the circuit of the brushes 6, 5, 9, and 10 sufficient to counter-balance and neutralize the effect of the current taken from the primary terminals of transformers T¹ and T². This discharge from the battery passing through coil 113 on the electromagnet 109 will apply a retarding force to the disc 108 and if this effect is of sufficient amount, will cause the arm 7 to be displaced with respect to the arm 105, thus reducing the direct current counter-electro-motive force of the apparatus as compared with the alternating current E. M. F. This will compensate for the drop in battery voltage due to its discharge and maintain the alternating current voltage more nearly constant.

The source of alternating current E. M. F. A may be connected to the alternating current circuit 1, 2, 3, 4, by the switches shown, so that the two sources of electrical energy, namely: the source A and the battery 110, may thus be operated in parallel. The motor M as described above may be operated either from the direct current circuit or from the alternating current circuit. Under suitable conditions, this motor may be connected to both the alternating current and the direct current circuits. This motor may be operated wholly from the A. C. circuit even with the source A disconnected, as it will then derive its energy through the converting apparatus from the direct current source.

The brushes shown in Fig. 1 during their rotation about the commutator will in passing from one commutator segment to the next, short circuit a certain number of coils of the secondary windings of the transformers, thus causing a current to flow in the local circuit including these coils, the commutator leads, the segments and the brushes. If the apparatus is confined to operation at comparatively low voltages and a comparatively large number of commutator segments is used in combination with high resistance brushes, it will be possible to reduce these local currents to small values which will not be seriously objectionable. If, however, it is desired to avoid such imitations and improve the commutating conditions, the design shown in Fig. 4 may be used. In this arrangement each of the commutators shown in Fig. 1 is replaced by two commutators here shown as two concentric rings C³ and C⁴, or C⁵ and C⁶. Each of these rings is divided into segments whereof every alternate segment is dead; that is, is entirely disconnected from the circuit, except when the brush is passing over it. These dead segments may be of the same material as the active segments of the commutator, but insulated therefrom; or they may be made of any other suitable material. The dead segments are staggered with respect to each other in the two commutator rings. The active segments of the two rings are connected to the transformer windings, the connections from the windings being made alternately first to a segment of the outer commutator ring and then to the next adjacent segment of the inner ring, etc. The active segments at the opposite ends of parallel chords are connected together as in Fig. 1. Each of the brushes shown in Fig. 1 is replaced by two brushes, one bearing on the outer commutator ring and the other bearing on the inner ring. In this figure, for the sake of clearness, the arms which support the rotating brushes and the shaft on which these arms are carried, as well as the motor for driving the shaft have been omitted, but it will be understood that these features or their equivalent will be included in the apparatus. Also the primary windings of the transformers T¹ and T² have been omitted, but it will be understood that such primary windings may be included in the apparatus or the alternating current circuit may be connected directly to the terminals of the secondary windings 31, 19, 70 and 71.

Figure 4:
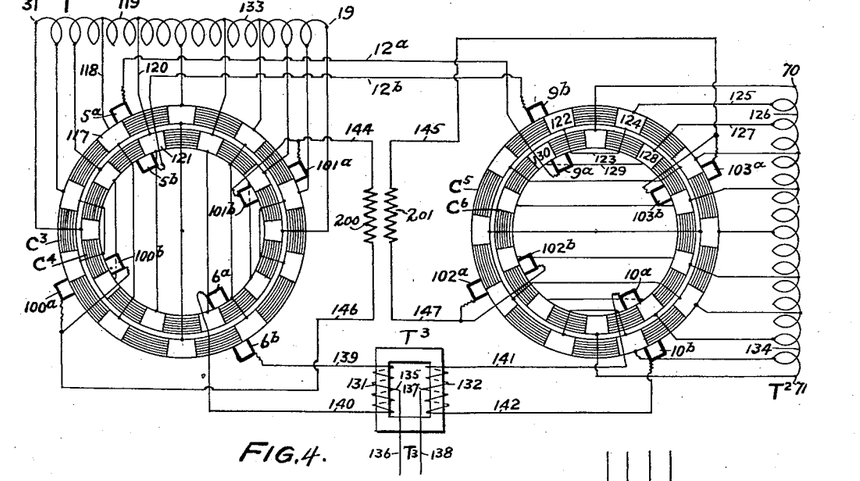
Fig. 4 shows diagrammatically a modification of the apparatus shown in Fig. 1 designed to improve the commutation at the direct current brushes.

Brush 5ª which bears on commutator C³ is connected by means of conductor 12ª to brush 9ª, which bears on commutator C⁶. Brush 5ᵇ which bears on C⁴ is connected by means of conductor 12ᵇ to brush 9ᵇ, which bears on commutator C⁵. The width of the brushes is less than that of the dead segments of the commutator, so that the brush can not bridge across between two consecutive active segments. Whenever the brushes 5ª and 9ª are in contact only with dead segments of their respective commutators, they will be insulated from the rest of the apparatus and will be carrying no current. At these times, however, the brushes 5ᵇ and 9ᵇ will be in contact with active segments and will be carrying whatever current is passing through the transforming apparatus to the external circuit. As the brushes revolve, brushes 5ª and 9ª will leave the dead segments and come in contact with active segments while brushes 5ᵇ and 9ᵇ will at the same time pass from active segments to dead segments. The current which is passing through the apparatus will, therefore, be transmitted alternately by conductors 12² and 12ᵇ.

When the brushes 5ª, 5ᵇ, 9ª, and 9ᵇ are so located as to be in contact with an active segment and the adjacent dead segment as shown in Fig. 4, a local circuit will be established which may be traced from brush 5ª via commutator segment 117, conductor 118, transformer coil 119, conductor 120, commutator segment 121, brush 5ᵇ, conductor 12ᵇ, brush 9ᵇ, commutator segment 122, conductor 123, commutator segment 124, conductor 125, transformer coil 126, conductor 127, commutator segment 128, conductor 129, commutator segment 130, brush 9ª, conductor 12ª, back to brush 5ª. This circuit includes one coil of the secondary winding of transformer T¹ and one coil of the secondary winding of transformer T². These coils will ordinarily both be developing an instantaneous E. M. F., but it will be found that the instantaneous values of these E. M. F.'s are substantially equal and opposed to each other. Under the conditions shown in Fig. 4, the E. M. F. in coil 119 is increasing while the E. M. F. of coil 126 is decreasing. These changes in E. M. F. will be small during the time required by the brushes to pass from one segment to the next, and moreover these changes will be in the right direction to effect the transfer of current from conductor 12ᵇ to conductor 12ª against the resistance and inductance of the local circuit. By properly proportioning the apparatus, advantage may be taken of these factors to obtain practically sparkless commutation.

Brushes 6ª and 6ᵇ are connected to the opposite terminals of a winding 131 of a transformer T³ and brushes 10ª and 10ᵇ are similarly connected to the opposite terminals of a winding 132 on the same transformer. In the position shown in the drawing, brushes 6ª and 6ᵇ are connected to the opposite ends of a coil 133 of the secondary winding of transformer T¹, and there will, therefore, be a difference of potential between the brushes 6ª and 6ᵇ. This difference of potential, however, is balanced by the counter E. M. F. in the transformer T³, so that only an inappreciable flow of current will occur between the brushes 6ª and 6ᵇ sufficient to produce the necessary magnetization in transformer T³ to develop the counter E. M. F. required. Similarly brushes 10ª and 10ᵇ are connected across coil 134 of the secondary winding of transformer T², but, as explained in connection with the brushes 5ª, 5ᵇ, 9ª, and 9ᵇ, the voltage at any instant developed in the coil 134 will be substantially the same as that developed in coil 133, and the windings 131 and 132 are so designed that the same magnetic flux in the transformer T³ will develop the necessary counter E. M. F. in each winding to oppose that developed in the corresponding transformer coil 133 or 134. From the middle point 135 of winding 131, a conductor 136 is taken, which constitutes one of the direct current terminals of the apparatus, and from the middle point 137 of winding 132, another conductor 138 is taken, which constitutes the opposite direct terminal of the apparatus. Any current which is delivered from the external circuit to the transforming apparatus will pass through conductor 136, for example, and will be transmitted alternately by conductor 139 and 140 to brush 6ᵇ and 6ª respectively, according to which one of these brushes is making contact with an active segment of the commutator. Similarly current in conductor 138 will be transmitted alternately by conductor 141 or 142, according to whether brush 10ª or 10ᵇ is in contact with an active segment. The directions in which the windings 131 and 132 are wound will be such that these currents will at all times neutralize each other in their effects on the magnetic flux in the transformer.

The commutating conditions at the short circuited brushes 100ª, 100ᵇ, 101ª, 101ᵇ, 102ª, 102ᵇ, 103ª and 103ᵇ are somewhat different, and the E. M. F.'s developed in the coils of transformers T¹ and T² which are in circuit between the two brushes of each pair at any instant cannot be counter-balanced as in the case of the main brushes. These short circuited brushes, however, carry only the comparatively small magnetizing current necessary to develop the counter E. M. F. of the apparatus, and brushes of comparatively high resistance may be used to suppress the local currents. Brush 100ª is connected to brush 100ᵇ, and these two brushes are connected by conductor 146 to one terminal of transformer winding 200. Brushes 101ª and 101ᵇ are similarly interconnected and connected by conductor 144 to the other terminal of transformer winding 200. Similarly brushes 102ª and 102ᵇ and brushes 103ª and 103ᵇ are interconnected in pairs and connected to opposite terminals of transformer winding 201. These transformer windings 200 and 201 operate in the same manner as described above in connection with Fig. 1 to prevent the flow of alternating currents, but permit the direct magnetizing current to pass.

Figure 5:
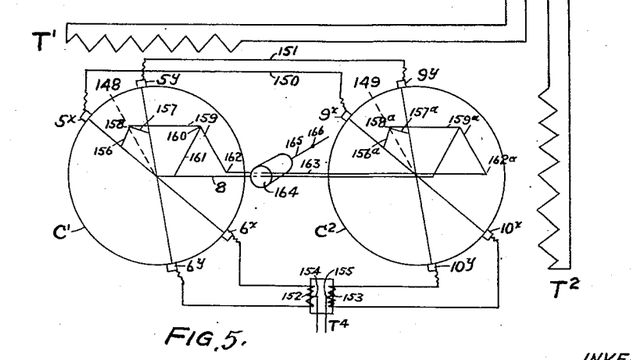
Fig. 5 is a skeleton diagram illustrating an arrangement for simultaneously controlling the ratio of A. C. and D. C. electro-motive-force and power factor.

In Fig. 5 is shown a modification adapted to permit a variation of voltage ratio between the A. C and D. C. terminals of the converting apparatus while maintaining unity power factor. For the sake of simplicity, Fig. 5 is in the form of a skeleton diagram, showing merely the centre lines of the various parts of the apparatus, and circles $C^1$ and $C^2$ represent the two commutators of Fig. 1, which would be connected to transformers $T^1$ and $T^2$, as described in connection with Fig. 1. Two pair of brushes $5^x$ and $6^x$ and $5^y$ and $6^y$ are shown bearing upon commutator $C^1$ displaced on either side of the mean position represented by the dotted line 148. Similarly two pair of brushes $9^x$, $10^x$, and $9^y$, $10^y$ bear upon commutator $C^2$ displaced on either side of the mean position, as shown by dotted line 149. The mean position of the brushes, as shown by the two dotted lines, corresponds to the position which produces the maximum ratio of direct current to alternating current E. M. F. and which gives unity power factor. If the brushes are displaced in advance of this position, the direct current voltage is reduced as compared with the A. C. voltage and the corresponding current has a leading power factor, whereas if the brushes are retarded, the direct current voltage will likewise be reduced as compared with the A. C. voltage, but the power factor will be lagging. If two pair of brushes are provided for each commutator, as shown in Fig. 5, one pair being advanced and the other pair retarded by equal angles from the mean position, the direct current E. M. F. derived from each pair of brushes will be the same, and if equal direct currents are taken from each pair of brushes, the leading and lagging wattless components of current in the A. C. circuit will neutralize each other and the power factor will be restored to unity. In Fig. 5, brush $5^x$ is connected to brush $9^x$ by conductor 150, and brush $5^y$ is connected to brush $9^y$ by conductor 151. Brushes $6^x$ and $6^y$ are connected to opposite terminals of a winding 152 on the transformer $T^4$, while brushes $10^x$ and $10^y$ are connected to the opposite terminals of a winding 153 on the same transformer. Thus the instantaneous difference of potential between brushes $6^x$ and $6^y$ and between brushes $10^x$ and $10^y$ will be opposed by the counter-electro-motive-force of the transformer $T^4$, preventing any appreciable amount of current from flowing in the local circuit between these brushes. The middle point 154 of winding 152 constitutes one terminal of the direct current circuit and the middle point 155 of winding 153 constitutes the other terminal of the direct current circuit. The direct current will divide equally on both sides of the points 154 and 155, and thus the effect of this current on the magnetism in the transformer $T^4$ will be neutralized. By varying the angular displacement of the brushes from the mean position, the direct current E. M. F. may be varied, while the alternating current E. M. F. remains constant, or vice versa. Means for varying this angular displacement are shown in skeleton form in Fig. 5. Two links 156 and 157 connected respectively to the arms which support brushes $5^x$ and $5^y$ and united at a common point 158, serve to separate or bring together the brushes $5^x$ and $5^y$, according as the junction point 158 is moved radially inward or outward along the dotted line 148. The junction point 158 is attached to the extremity of a bell crank 159, pivotally supported at the point 160 on an arm 161 carried by the revolving shaft 8. A similar bell crank $159^a$ serves by means of links $156^a$ and $157^a$ to control the position of brushes $9^x$ and $9^y$ which bear upon the commutator $C^2$. The lower extremities 162 and $162^a$ of the two bell cranks are attached to a horizontal bar 163, which may be moved horizontally in either direction along the shaft 8, thereby adjusting the position of the junction points 158 and $158^a$, and shifting the brushes toward or away from their mean position. The position of the horizontal bar 163 may be adjusted by means of a circular collar 164 to which the bar 163 is attached and which may slide along the shaft 8 longitudinally in either direction. A forked lever 165 pivoted at 166 engages at its forked end with a groove in the collar 164, whereby the collar may be shifted longitudinally on the shaft 8.

In the apparatus described above for the purpose of illustration a two phase alternating current circuit is shown. The apparatus may, however, be applied to an alternating current circuit of any number of phases. For each phase of the alternating current circuit there would be required a transformer winding, similar to $T^1$ or $T^2$ and a commutator and brushes with connections from the commutator segments to the winding arranged as described above. The several pairs of brushes which carry the main current would be connected in series and each pair of short circuited brushes, if these are used, would be connected to opposite terminals of a polyphase transformer winding.

It will be noted that any one of the converting devices described above constitutes a means whereby two of the brushes bearing on the commutator may be simultaneously shifted in opposite directions along the series of taps in the corresponding winding, so that during any one complete cycle, the portion of the winding included in circuit between the two brushes is varied sinusoidally from a maximum in one direction through zero to a maximum in the other direction and then back through zero to the original maximum.

In the examples given above, a bi-polar arrangement has been shown, in which one complete revolution of the brushes corresponds to one cycle of the alternating E. M. F. It will be readily understood, however, by those skilled in the art, that a multipolar arrangement of commutator and brushes may be adopted, if for a given frequency on the A. C. circuit it is desired to provide for a lower angular velocity of the brushes.

This application is a continuation in part of my application, Ser. No. 232,605, filed May 4th, 1918.

Having described my invention, what I claim and desire to secure by Letters Patent is:

1. Apparatus for interconverting direct and alternating currents comprising the combination of a polyphase alternating current circuit, a direct current circuit, a winding operatively connected to each phase of the polyphase circuit and provided with taps, two relatively displaced pairs of brushes, co-operating with the taps of each winding, means for simultaneously shifting the brushes of each pair in opposite directions along the corresponding taps, means for connecting one of said pairs of brushes for each winding in series across the direct current circuit, means electrically independent of the direct current circuit for interconnecting the other brushes in pairs and means for adjusting the relative position of the two pair of brushes for each winding, substantially as described.

2. Apparatus for interconverting direct and alternating currents comprising the combination of a polyphase alternating current circuit, a direct current circuit, a winding operatively connected to each phase of the polyphase circuit and provided with taps, two relatively displaced pairs of brushes co-operating with the taps of each winding, means for simultaneously shifting the brushes of each pair in opposite directions along the corresponding taps, means for connecting one of said pairs of brushes for each winding in series across the direct current circuit, means electrically independent of the direct current circuit for connecting the other brushes in pairs and electro-responsive means for adjusting the relative position of the two pair of brushes for each winding, substantially as described.

3. Apparatus for interconverting direct and alternating currents comprising the combination of a polyphase alternating current circuit, a direct current circuit, a winding operatively connected to each phase of the alternating current circuit and provided with taps, two relatively displaced pairs of brushes co-operating with the taps of each winding, means for shifting the brushes of each pair in opposite directions along the corresponding taps, two circuits each of which includes in series one pair of brushes for each winding, two induction coils, respectively interconnecting the corresponding terminals of the two circuits last mentioned, and a connection from an intermediate point of each induction coil to the direct current circuit, substantially as described.

4. Apparatus for interconverting direct and alternating currents comprising the combination of a polyphase alternating current circuit, a direct current circuit, a winding operatively connected to each phase of the alternating current circuit and provided with taps, two relatively displaced pairs of brushes co-operating with the taps of each winding, means for shifting the brushes of each pair in opposite directions along the corresponding taps, two circuits each of which includes in series one pair of brushes for each winding, two induction coils respectively interconnecting the corresponding terminals of the two circuits last mentioned, a connection from an intermediate point of each induction coil to the direct current circuit and means for adjusting the displacement of said brushes, substantially as described.

5. In apparatus for interconverting direct and alternating currents, the combination of a polyphase alternating current circuit, a direct current circuit, a winding operatively connected to each phase of the alternating current circuit and provided with taps having terminal contacts spaced from each other and arranged in two paths, brushes narrower than the spaces between consecutive contacts and co-operating in pairs with each of the contact paths, means for shifting the brushes of each pair along the corresponding path in opposite directions with respect to the taps, two circuits, each of which includes one pair of brushes for each winding, two induction coils interconnecting respectively the corresponding terminals of the two circuits last mentioned, and a connection from an intermediate point of each induction coil to the direct current circuit, substantially as described.

6. In apparatus for interconverting direct and alternating currents, the combination of a polyphase alternating current circuit, a direct current circuit, a winding operatively connected to each phase of the alterating currrent circuit and provided with taps having terminal contacts spaced from each other and arranged in two paths, brushes narrower than the spaces between consecutive contacts, means for shifting the brushes of each pair along the corresponding path in opposite directions with respect to the taps, two circuits, each of which includes one pair of brushes for each winding, two induction coils embracing a common magnetic circuit, said coils interconnecting respectively the corresponding terminals of the two circuits last mentioned, and a connection from an intermediate point of each induction coil to the direct current circuit substantially as described.

7. In apparatus for interconverting direct and alternating currents, the combination of a polyphase alternating current circuit, a direct current circuit, a winding operatively connected to each phase of the alternating current circuit and provided with taps having terminal contacts spaced from each other and arranged alternately in two paths, brushes narrower than the spaces between consecutive contacts and co-operating in pairs with each of the contact paths, means for shifting the brushes of each pair along the corresponding path in opposite directions with respect to the taps, a connection from each brush of one pair for each path to the corresponding brush of the alternate path, an induction coil for each phase, said coils embracing a common magnetic circuit, and connections from the interconnected brushes to the corresponding terminals of the induction coils, substantially as described.

8. In combination, a polyphase circuit, a direct current circuit, a transformer winding connected to each phase of the polyphase circuit, each winding having taps sinusoidally spaced symmetrically on each side of the middle point, a commutator for each winding comprising a series of contacts equally spaced around a circumference, whereof two diametrically opposite contacts are connected respectively to the two outermost taps of the winding and whereof each pair of contacts symmetrically disposed on either side of the two first mentioned contacts are interconnected and connected successively to the remaining taps, two pair of brushes for each commutator, means for connecting one pair of brushes for each commutator in series across the direct current circuit, a plurality of induction coils, one for each phase, wound on a common magnetic circuit and means for connecting the two brushes of the other pair for each commutator to the respective terminals of the corresponding induction coil, and means for producing relative rotation of commutators and brushes.

9. In apparatus for interconverting direct and alternating currents, the combination of a transformer winding provided with taps, two commutators whose segments are alternately active and dead, and whereof the active segments of each commutator are interconnected in pairs, connections from alternate taps to consecutive pairs of active segments of each commutator respectively, a pair of brushes for each commutator, so located that when one pair is in contact with dead segments of one commutator, the other pair is in contact with active segments of the other, and means for producing relative rotation of commutators and brushes, substantially as described.

10. Apparatus for interconverting direct and alternating currents comprising the combination of a polyphase alternating current circuit, a direct current circuit, a winding operatively connected to each phase of the polyphase circuit, each winding provided with taps, two commutators for each winding, whereof the segments are alternately active and dead, and whereof the active segments of each commutator are interconnected in pairs, connections from alternate taps of each winding to consecutive pairs of active segments of each of the two corresponding commutators respectively, four pair of brushes for each commutator, so spaced that when either pair of brushes for one of the commutators is in contact with dead segments, the corresponding pair for the other commutator connected to the same winding is in contact with active segments, means for producing relative rotation of commutators and the corresponding brushes, an induction coil for each phase, said coils embracing a common magnetic circuit, means for connecting two pair of brushes for each commutator to the corresponding induction coil, the opposite brushes of each pair being connected to the opposite terminals of the coil, two circuits interconnected at their corresponding ends by two induction coils, embracing a common magnetic circuit, each of said last named circuits including in series the second pair of brushes bearing on one of the commutators of each winding, and connections from intermediate points in the last mentioned induction coils to the direct current circuit, substantially as described.

In testimony whereof I have hereto set my hand this ninth day of November 1918.

J. LESTER WOODBRIDGE.